United States Patent
Martinez de Salinas Vasquez et al.

(10) Patent No.: US 9,760,971 B2
(45) Date of Patent: Sep. 12, 2017

(54) ESTABLISH IMAGE PIPELINE

(71) Applicant: Hewlett-Packard Development Company, L.P., Houston, TX (US)

(72) Inventors: Jorge Martinez de Salinas Vasquez, Sunnyvale, CA (US); Lluis Abello Rosello, Tarragona (ES); Marc Rossinyol Casals, Vancouver, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/787,468

(22) PCT Filed: Jun. 13, 2013

(86) PCT No.: PCT/US2013/045683
§ 371 (c)(1),
(2) Date: Oct. 27, 2015

(87) PCT Pub. No.: WO2014/200495
PCT Pub. Date: Dec. 18, 2014

(65) Prior Publication Data
US 2016/0086301 A1 Mar. 24, 2016

(51) Int. Cl.
*G06K 9/54* (2006.01)
*G06K 9/60* (2006.01)
*G06T 1/20* (2006.01)
*H04N 1/46* (2006.01)
*G06K 15/02* (2006.01)
(Continued)

(52) U.S. Cl.
CPC .............. *G06T 1/20* (2013.01); *G06K 15/02* (2013.01); *G06T 7/90* (2017.01); *H04N 1/46* (2013.01); *H04N 1/60* (2013.01)

(58) Field of Classification Search
None
See application file for complete search history.

(56) References Cited

U.S. PATENT DOCUMENTS 5,317,419 A     5/1994  Koizumi
5,805,914 A *   9/1998  Wise ..................... G06F 15/00
                                                    382/232
(Continued)

FOREIGN PATENT DOCUMENTS

JP    2010149525 A   7/2010
WO    WO-2008006131 A1   1/2008

OTHER PUBLICATIONS

Lins et al., "Image Classification to Improve Printing Quality of Mixed-Type Documents" in ICDAR 2009, pp. 1106-1110, Jul. 2009.*

(Continued)

*Primary Examiner* — Feng Niu
(74) *Attorney, Agent, or Firm* — HP Inc.—Patent Department

(57) ABSTRACT

An image pipeline execution method includes analyzing at least one attribute of an image and determining an image type of the image from a set of predetermined image types based on the analyzing the at least one attribute of the image. The image pipeline execution method also includes dynamically establishing an image pipeline to process the image based on the image type and executing the image pipeline to print the image.

14 Claims, 7 Drawing Sheets

(51) Int. Cl.
*H04N 1/60* (2006.01)
*G06T 7/90* (2017.01)

(56) References Cited

U.S. PATENT DOCUMENTS

| | | | |
|---|---|---|---|
| 5,970,178 A | 10/1999 | Lin | |
| 6,115,134 A * | 9/2000 | Creel | G06K 15/02 358/1.16 |
| 6,674,430 B1 * | 1/2004 | Kaufman | G06T 15/005 345/419 |
| 7,029,437 B2 * | 4/2006 | Kobayashi | A61B 1/018 348/E7.087 |
| 7,551,299 B2 * | 6/2009 | Ferlitsch | G06F 3/1205 358/1.13 |
| 7,733,535 B2 * | 6/2010 | Plunkett | H04N 1/4051 358/3.13 |
| 8,390,736 B2 * | 3/2013 | Yang | G06K 9/00234 348/364 |
| 8,933,975 B2 * | 1/2015 | Nakanishi | G09G 3/3426 345/102 |
| 2004/0165091 A1 * | 8/2004 | Takemura | H04N 5/2355 348/296 |
| 2004/0239983 A1 * | 12/2004 | Shiota | G06F 17/30256 358/1.15 |
| 2005/0122535 A1 | 6/2005 | Oki | |
| 2006/0023239 A1 * | 2/2006 | Ferlitsch | G06F 3/1205 358/1.13 |
| 2007/0103601 A1 * | 5/2007 | Izumi | G09G 3/20 348/687 |
| 2010/0328498 A1 * | 12/2010 | Yang | G06K 9/00234 348/234 |
| 2011/0096365 A1 | 4/2011 | Benedicto et al. | |
| 2012/0147437 A1 | 6/2012 | Nagai | |
| 2012/0274685 A1 * | 11/2012 | Mis | C09D 11/322 347/9 |
| 2013/0010312 A1 | 1/2013 | Kuo et al. | |
| 2013/0101328 A1 | 4/2013 | Morovic et al. | |

OTHER PUBLICATIONS

PCT International Search Report and Written Opinion, Mar. 28, 2014, PCT Application No. PCT/US2013/045683, Korean Intellectual Property Office, 10 pages.

Reddy, M.K.M. et al., A New Adaptive Edge Enhancement Algorithm for Color Laser Printers, IEEE International Conference on Acoustics, Speech and Signal Processing, Apr. 15-20, 2007, pp. 393-396, vol. 2.

* cited by examiner

ESTABLISH IMAGE PIPELINE

CROSS-REFERENCE TO RELATED APPLICATION

This application is a U.S. National Stage Application of and claims priority to International Patent Application No. PCT/US2013/045683, filed on Jun. 13, 2013, and entitled "ESTABLISH IMAGE PIPELINE," which is hereby incorporated by reference in its entirety.

BACKGROUND

A printing system includes a fluid applicator device and an image pipeline. The fluid applicator device may apply printing fluid to a substrate to form an image thereon. The image pipeline may transform continuous tone image data to halftone image data.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

A printing system may include a fluid applicator device and an image pipeline. The fluid applicator device may apply printing fluid to a substrate such as paper, and the like, to form an image thereon based on image data processed by the image pipeline of the printing system. Alternatively, the fluid applicator unit may apply printing fluid to a substrate such as a transfer member (e.g., image forming blanket) which subsequently may be transferred to a substrate such as paper, and the like. The image pipeline, for example, may transform continuous tone image data such as Red, Green, Blue (RGB) continuous image data having 8 bits per pixel to halftone image data such as a Cyan, Magenta, Yellow, Black (CMYK) halftone image data having 2 bits per pixel. The same image pipeline, however, may process the image data for different image types such as computer aided design (CAD) images and graphic images. The different types of images, however, may have different requirements that may not be fully addressed by the same image pipeline. For example, an image pipeline including a line enhancement stage may benefit CAD images, but potentially degrade graphic images. Thus, the same image pipeline for all image types lacks an ability to dynamically establish, for example, a respective specialized image pipeline for different image types to achieve high quality images in a cost effective manner. Also, a printing system including numerous independent image pipelines in which respective statically-implemented image pipelines correspond to respective image types may increase the cost of the printing system and size of the silicon devices thereof. Thus, a printing system using the same image pipeline and/or numerous independent image pipelines may increase image degradation and/or cost.

In examples, an image pipeline execution method includes analyzing at least one attribute of an image, determining an image type of the image from a set of predetermined image types based on the analyzing the at least one attribute of the image, dynamically establishing a respective image pipeline to process the image based on the respective image type, and executing the image pipeline to print the image. Thus, dynamically establishing a respective image pipeline to process the image based on a respective image type may decrease the cost of the printing system, the size of the silicon devices thereof, and/or image degradation. That is, an ability to dynamically establish a respective specialized image pipeline for different image types may achieve high quality images in a cost effective manner.

Figure 1:
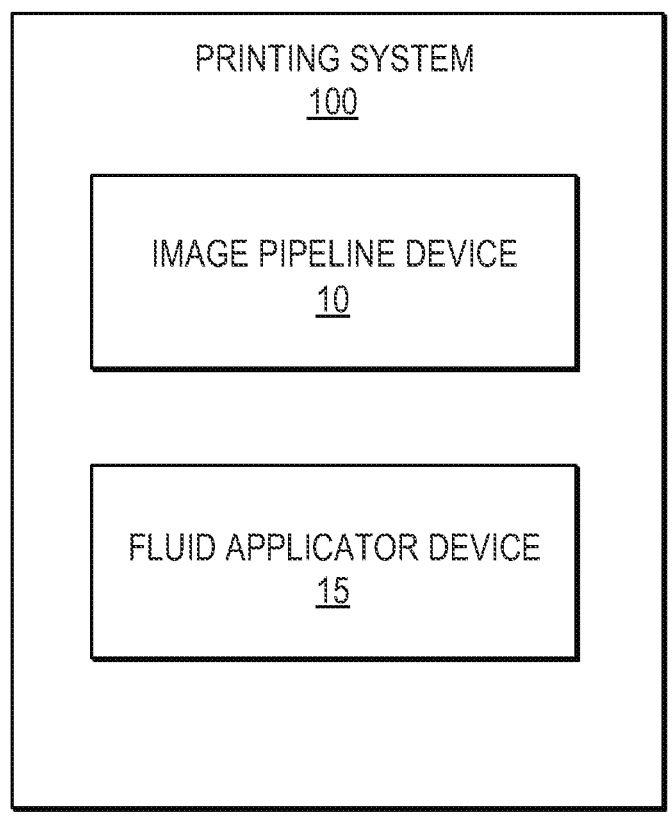
FIG. 1 is a block diagram illustrating a printing system according to an example.

FIG. 1 is a block diagram illustrating a printing system according to an example. Referring to FIG. 1, in some examples, a printing system 100 includes an image pipeline device 10 and a fluid applicator unit 15. The image pipeline device 10 may analyze at least one attribute of an image and determine an image type of the image from a set of predetermined image types based on the analyzing the at least one attribute of the image. For example, the attribute may include density, color, and the like. The image pipeline device 10 may also dynamically establish an image pipeline to process the image based on the image type and execute the image pipeline. Accordingly, an ability to dynamically form a respective specialized image pipeline for different image types may achieve high quality images in a cost effective manner. The image pipeline device 10 may be implemented in hardware, software including firmware, or combinations thereof.

For example, the firmware may be stored in memory and executed by a suitable instruction-execution system. If implemented in hardware, as in an alternative example, the image pipeline device 10 may be implemented with any or a combination of technologies which are well known in the art (for example, discrete-logic circuits, programmable-gate arrays (PGAs), field-programmable gate arrays (FPGAs)), and/or other later developed technologies. In some examples, the image pipeline device 10 may be implemented in a combination of software and data executed and stored under the control of a computing device.

Referring to FIG. 1, in some examples, the fluid applicator device 15 may print the image on a substrate based on execution of the image pipeline. In some examples, the fluid applicator device 15 may include a printhead, printhead modules, a printbar, and/or a printhead assembly, and the like. The printing system 100, for example, may include an inkjet printer and the fluid applicator unit 15 may include an inkjet printhead. The printing system 100 may directly apply printing fluid to a substrate such as paper, and the like. Alternatively, the printing system 100, for example, may apply printing fluid to a substrate such as a transfer member (e.g., image forming blanket) which subsequently may be transferred to a substrate such as paper, and the like.

Figure 2:
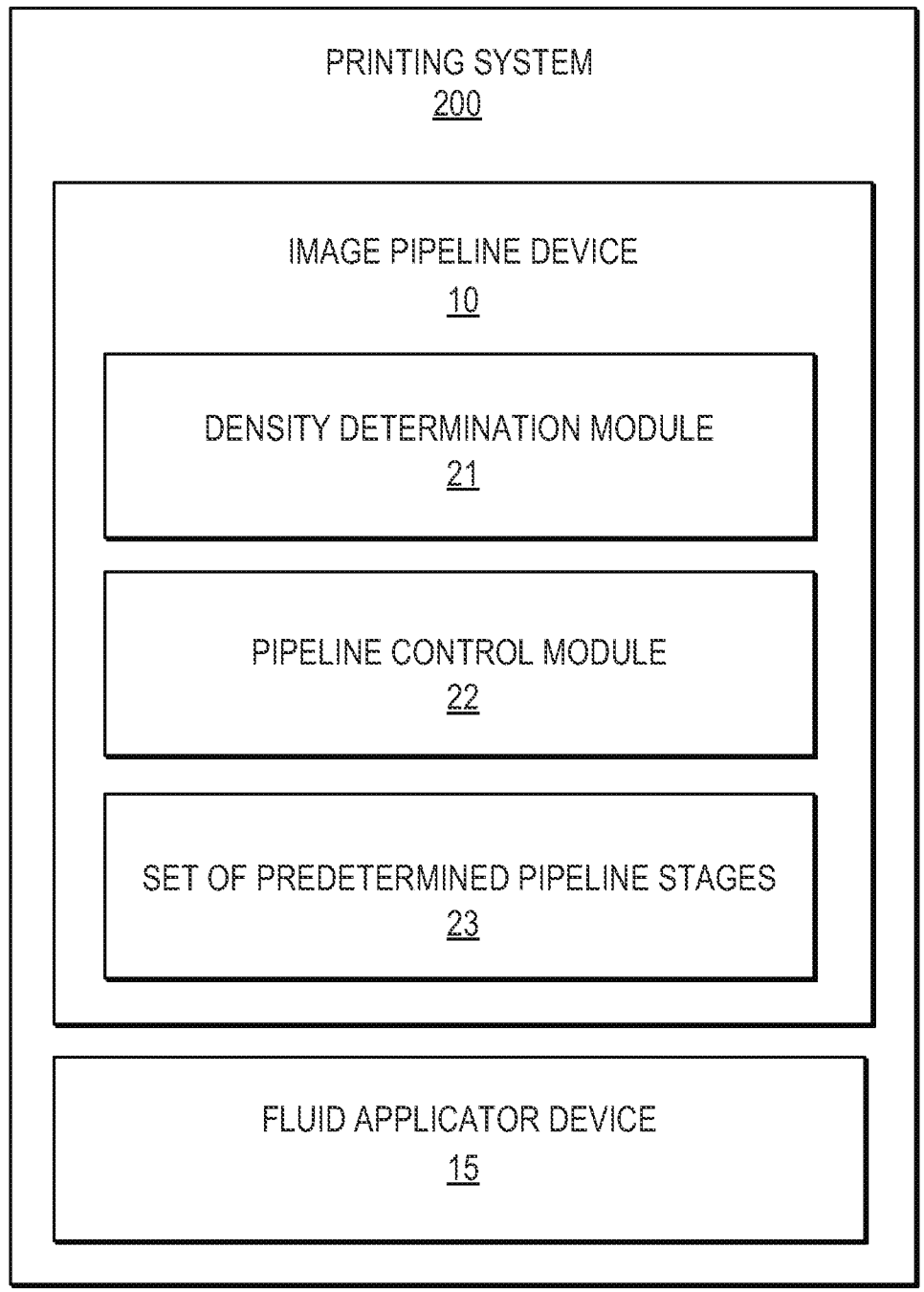
FIG. 2 is a block diagram illustrating a printing system according to an example.

FIG. 2 is a block diagram illustrating a printing system according to an example. In some examples, a printing system 200 includes the image pipeline device 10 and the fluid applicator unit 15 of the printing system 100 of FIG. 1 as previously discussed. Referring to FIG. 2, in some examples, the image pipeline device 10 may analyze an attribute such as density of an image and determine an image type of the image from a set of predetermined image types based on the analyzing the density of the image. For example, the set of predetermined image types may include a color computer aided design (CAD) type, a black and white CAD type, a black and white graphic image type, and a color graphic image type. In some examples, the image pipeline device 10 may analyze a plurality of attributes of the image such as density, color, and the like. The image pipeline device 10 may also dynamically establish an image pipeline to process the image based on the image type and execute the image pipeline. The fluid applicator device 15 may be configured to print a half-tone image on a substrate. For example, the fluid applicator device 15 may print the half-tone image based on image data output from the image pipeline.

Referring to FIG. 2, in some examples, the image pipeline device 10 may include a density determination module 21, a pipeline control module 22, and a set of predetermined pipeline stages 23. The density determination module 21, the pipeline control module 22, and the set of predetermined pipeline stages 23 may be implemented in hardware, software including firmware, or combinations thereof.

For example, the firmware may be stored in memory and executed by a suitable instruction-execution system. If implemented in hardware, as in an alternative example, the density determination module 21, the pipeline control module 22, and the set of predetermined pipeline stages 23 may be implemented with any or a combination of technologies which are well known in the art (for example, discrete-logic circuits, PGAs, FPGAs), and/or other later developed technologies.

Referring to FIG. 2, in some examples, the density determination module 21, the pipeline control module 22, and the set of predetermined pipeline stages 23 may be implemented in a combination of software and data executed and stored under the control of a computing device. The density determination module 21 may identify an image as a plurality of sections, determine a section density level for each one of the sections, and determine an image density level based on a number of the sections corresponding to respective section density levels. In some examples, the sections may be square-shaped, rectangular-shaped, and the like.

Referring to FIG. 2, in some examples, the pipeline control module 22 may select a plurality of pipeline stages from a set of predetermined pipeline stages 23 to form selected pipeline stages and determine an arranged order of execution of the selected pipeline stages to form the image pipeline. The pipeline control module 22 is configured to process the image by the selected pipeline stages in the respective arranged order thereof (e.g., established image pipeline) and transform the image to a half-tone image.

Figure 3A:
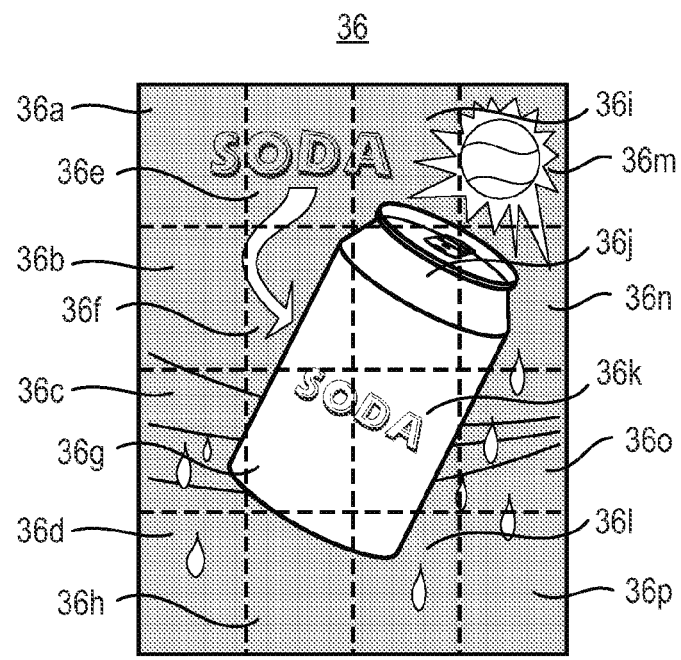
FIGS. 3A and 4A are representational views of respective image types to be analyzed and determined by the image pipeline device of the printing system of FIG. 2 according to examples.
Figure 3B:
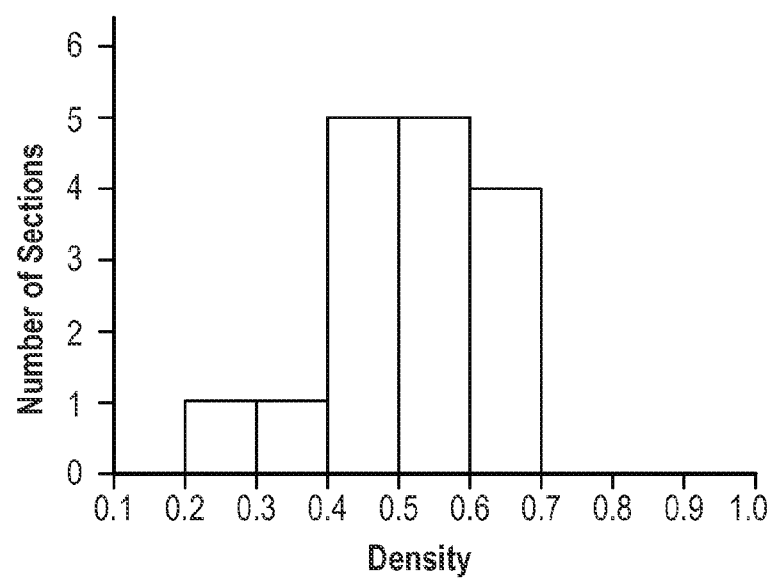
FIGS. 3B and 4B are image density charts corresponding to the image types of FIGS. 3A and 4A, respectively, according to examples.
Figure 4A:
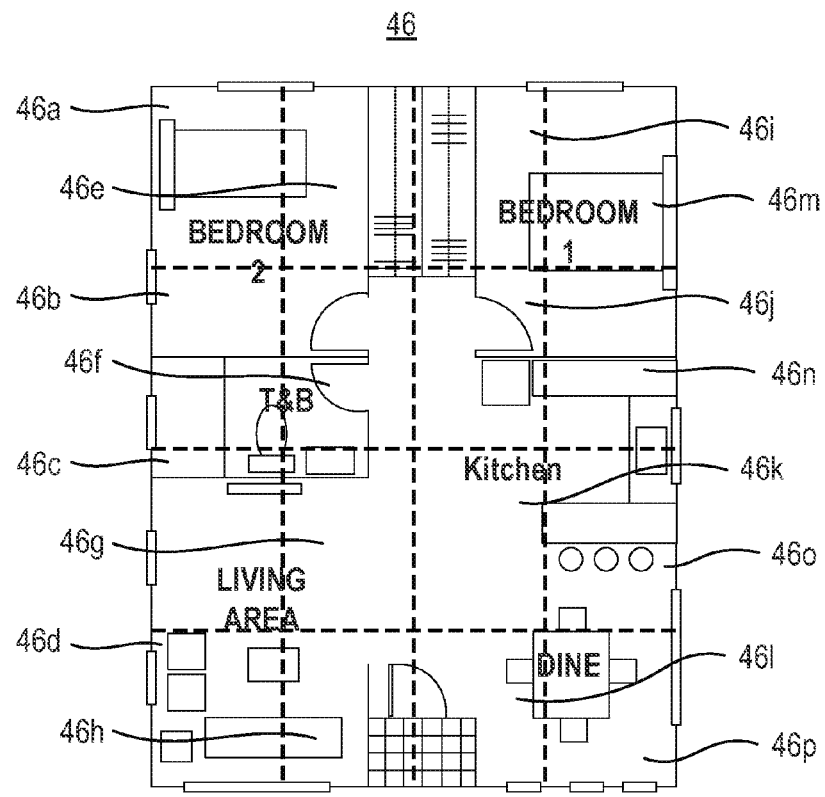
Figure 4B:
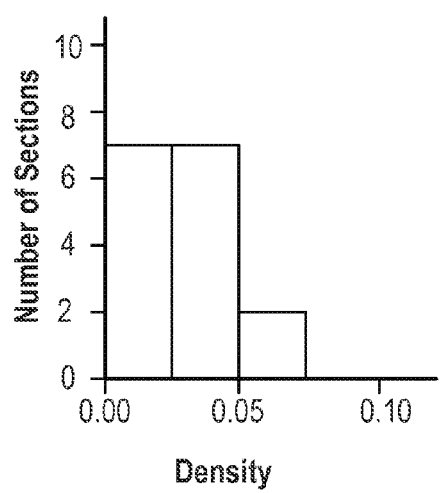

FIGS. 3A and 4A are representational views of respective image types to be analyzed and determined by an image pipeline device of the printing system of FIG. 2 according to examples. FIGS. 3B and 4B are image density charts corresponding to the image types of FIGS. 3A and 4A, respectively, according to examples. Referring to FIGS. 2-4B, in some examples, an image 36, 46 is analyzed and its density is determined by a density determination module 21 of an image pipeline device 10. For example, using the respective image data in memory, the density determination module 21 may identify a respective image 36, 46 as a plurality of sections ($36_a$, $36_b$, $36_c$, $36_d$, $36_e$, $36_f$, $36_g$, $36_h$, $36_i$, $36_j$, $36_k$, $36_l$, $36_m$, $36_n$, $36_o$, $36_p$), ($46_a$, $46_b$, $46_c$, $46_d$, $46_e$, $46_f$, $46_g$, $46_h$, $46_i$, $46_j$, $46_k$, $46_l$, $46_m$, $46_n$, $46_o$, $46_p$), determine a section density level for each one of the sections ($36_a$, ..., $36_p$), ($46_a$, ..., $46_p$), and determine an image density level based on a number of the sections ($36_a$, ..., $36_p$), ($46_a$, ..., $46_p$) corresponding to respective section density levels. For example, a respective section density level may include a value corresponding to a density of the respective section.

In some examples, the image density level may correspond to a relative density of the entire image based on the respective section density levels for each of the respective sections. For example, if a high number of sections have high density, the image type of the image may correspond to a graphic image. Alternatively, if a high number of sections have low density, the image type of the image may correspond to a CAD image.

Referring to FIG. 3A, the respective image 36 is identified as sixteen sections ($36_a$, ..., $36_p$) and most of the sections have an image density in a range of forty percent to seventy percent as illustrated in FIG. 3B. FIG. 3B is a bar chart depicting the number of sections of the image 36 having a respective density. Thus, in this example, the image 36 may correspond to an image type being a graphic image. Further, a determination may be made as to whether the respective sections include various colors to determine whether the image type is a color graphic image, or a black and white graphic image.

Referring to FIG. 4A, the respective image 46 is identified as sixteen sections ($46_a$, ..., $46_p$) and most of the sections have an image density in a range of zero percent to five percent as illustrated in FIG. 4B. FIG. 4B is a bar chart depicting the number of sections of the image 46 having a respective density. Thus, in this example, the image 46 may correspond to an image type being a CAD image. Further, a determination may be made as to whether the respective sections include various colors to determine whether the image type is a color CAD image, or a black and white CAD image. In some examples, a respective section being entirely black may correspond to a section density value of 100 percent and a respective section being entirely white may correspond to a section density value of zero percent.

Figure 5A:
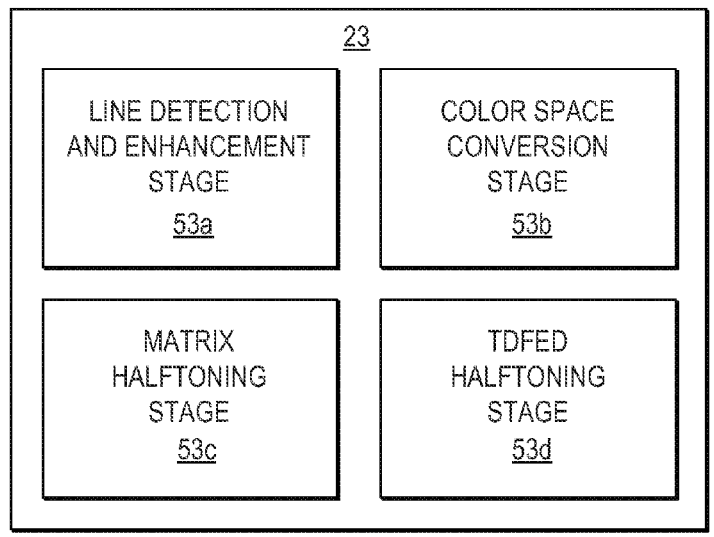
FIG. 5A is a block diagram illustrating a set of predetermined pipeline stages of the printing system of FIG. 2 according to an example.
Figure 5B:
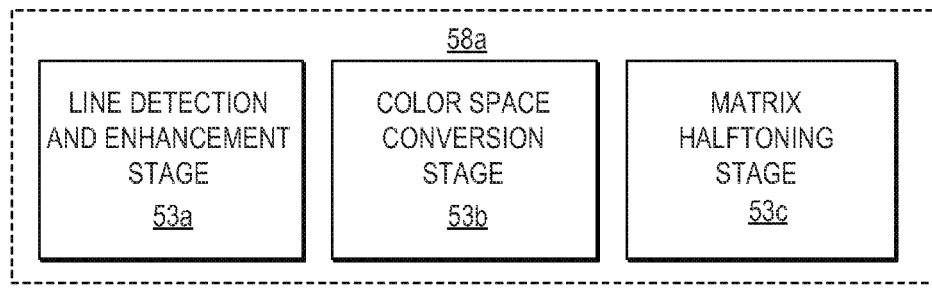
FIGS. 5B and 5C are block diagrams illustrating respective image pipelines established from the set of predetermined pipeline stages of FIG. 5A according to examples.
Figure 5C:
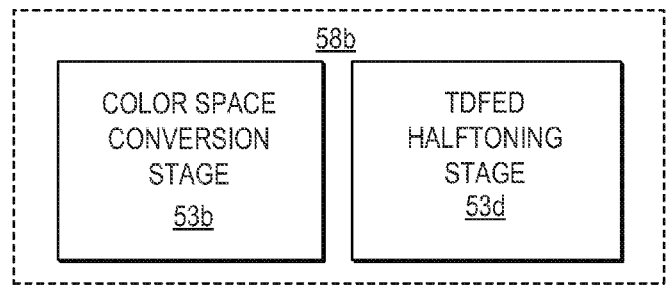

FIG. 5A is a block diagram illustrating a set of predetermined pipeline stages of the printing system of FIG. 2 according to an example. FIGS. 5B and 5C are block diagrams illustrating respective image pipelines established from the set of predetermined pipeline stages of FIG. 5A according to an example. Referring to FIGS. 5A-5C, in some examples, the pipeline control module 22 (FIG. 2) may select a plurality of pipeline stages from a set of predetermined pipeline stages 23 to form selected pipeline stages and determine an arranged order of execution of the selected pipeline stages to form the respective image pipeline 58a, 58b. That is, the pipeline control module 22 may select and arrange respective pipeline stages based on the respective image type to establish a respective image pipeline 58a, 58b to more closely meet respective requirements (e.g., optimize) of the respective image type. The ability to dynamically establish a respective specialized image pipeline 58a, 58b for different image types may achieve high quality images in a cost effective manner.

Referring to FIG. 5A, for example, the predetermined pipeline stages 23 may include a line detection and enhancement stage 53a to detect and enhance lines of an image, a color space conversion stage 53b to translate a representation of a color from one basis to another of an image, and halftoning stages to represent a continuous tone image by a series of dots in a specific pattern. The halftoning stages may include a matrix halftoning stage 53c and a tone dependent fast error diffusion (TDFED) halftoning stage. Referring to FIG. 5B, in some examples, the pipeline control module 22 (e.g., FIG. 2) may select and arrange respective pipeline stages such as the line detection and enhancement stage 53a, the color space conversion stage 53b, and the matrix halftoning stage 53c based on a color CAD image type to form a respective image pipeline 58a to more closely meet respective requirements of the color CAD image type.

Referring to FIG. 5C, in some examples, the pipeline control module 22 (FIG. 2) may select and arrange respective pipeline stages such as the color space conversion stage 53b and the TDFED halftoning stage 53d based on a color graphic image type to form a respective image pipeline 58b to more closely meet respective requirements of the color graphic image type. The pipeline control module 22 is configured to process the image by the selected pipeline stages in the respective arranged order thereof (e.g., established image pipeline 58a, 58b) and transform the image to a half-tone image. In some examples, the respective image pipeline 58a, 58b may receive RGB continuous image data and output CMYK halftone image data.

Figure 6:
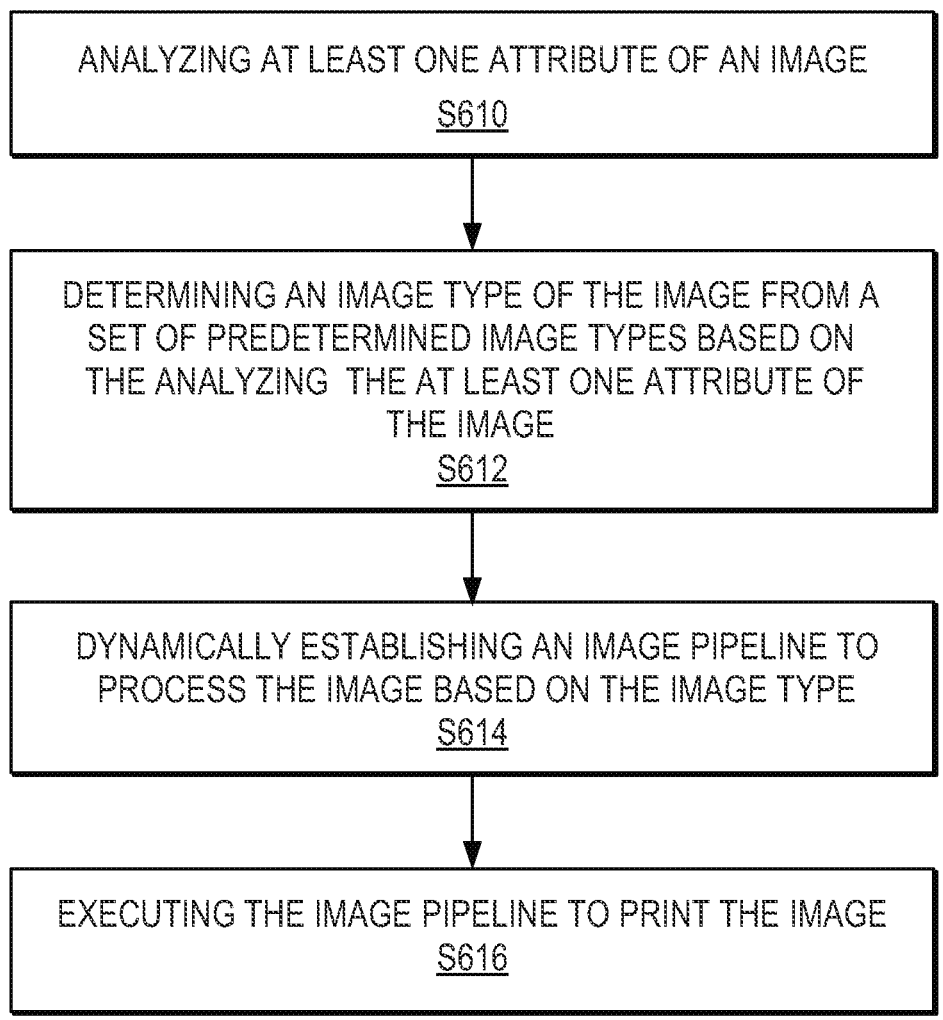
FIG. 6 is a flowchart illustrating an image pipeline execution method according to an example.

FIG. 6 is a flowchart illustrating an image pipeline execution method according to an example. Referring to FIG. 6, in block S610, at least one attribute of an image is analyzed. In some examples, the at least one attribute may include density, color, and the like. For example, analyzing the density of the image may include identifying the image as a plurality of sections, determining a section density level for each one of the sections, and determining an image density level based on a number of the sections corresponding to respective section density levels. In block S612, an image type of the image is determined from a set of predetermined image types based on the analyzing the at least one attribute of the image. In some examples, the image type of the image may be determined based on an image density level. In some examples, the set of predetermined image types may include a CAD type, a black and white CAD type, a black and white graphic image type, and a color graphic image type.

In block S614, an image pipeline is dynamically established to process the image based on the image type. Dynamically establishing an image pipeline to process the image based on the image may include selecting a plurality of pipeline stages from a set of predetermined pipeline stages to form selected pipeline stages and determining an arranged order of execution of the selected pipeline stages to establish the image pipeline. In some examples, the predetermined pipeline stages may include a line detection and enhancement stage, a color space conversion stage, and a halftoning stage.

In block S616, the image pipeline is executed to print the image. For example, executing the image pipeline to print the image may include processing the image by the selected pipeline stages and in the arranged order thereof, and transforming the image to a half-tone image. In some examples, the image pipeline execution method may also include printing the half-tone image on a substrate.

Figure 7:
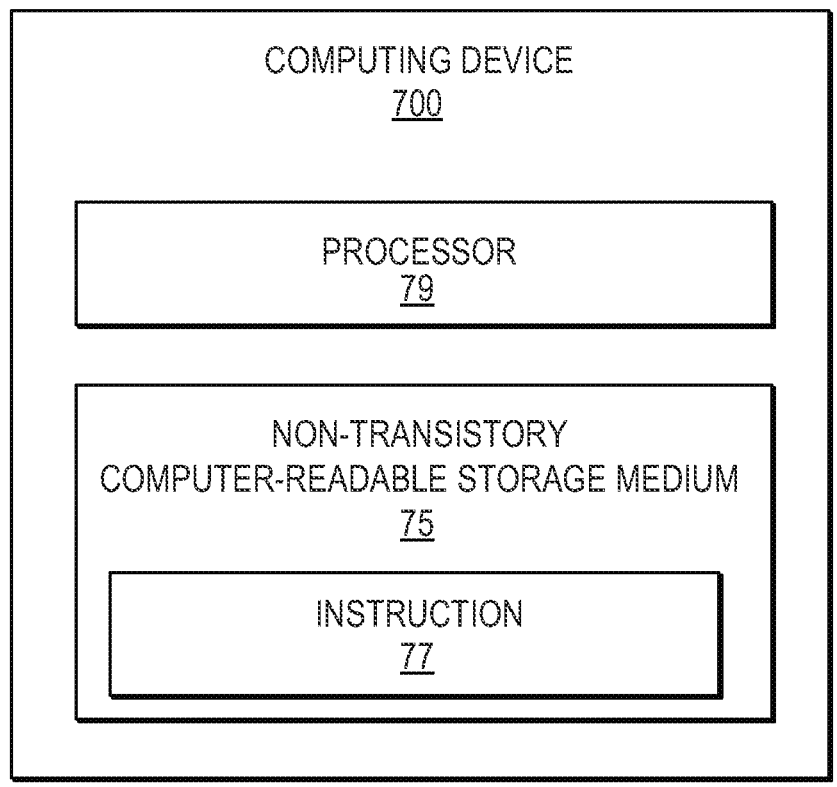
FIG. 7 is a block diagram illustrating a computing device such as a printing system including a processor and a non-transitory, computer-readable storage medium to store instructions to operate the printing system according to an example.

FIG. 7 is a block diagram illustrating a computing device such as a printing system including a processor and a non-transitory, computer-readable storage medium to store instructions to operate the printing system according to an example. Referring to FIG. 7, in some examples, the non-transitory, computer-readable storage medium 75 may be included in a computing device 700 such as a printing system. In some examples, the non-transitory, computer-readable storage medium 75 may be implemented in whole or in part as instructions 77 such as computer-implemented instructions stored in the computing device locally or remotely, for example, in a server or a host computing device considered herein to be part of the printing system.

Referring to FIG. 7, in some examples, the non-transitory, computer-readable storage medium 75 may correspond to a storage device that stores instructions 77, such as computer-implemented instructions and/or programming code, and the like. For example, the non-transitory, computer-readable storage medium 75 may include a non-volatile memory, a volatile memory, and/or a storage device. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM).

Referring to FIG. 7, examples of storage devices include, but are not limited to, hard disk drives, compact disc drives, digital versatile disc drives, optical drives, and flash memory devices. In some examples, the non-transitory, computer-readable storage medium 75 may even be paper or another suitable medium upon which the instructions 77 are printed, as the instructions 77 can be electronically captured, via, for instance, optical scanning of the paper or other medium, then compiled, interpreted or otherwise processed in a single manner, if necessary, and then stored therein. A processor 79 generally retrieves and executes the instructions 77 stored in the non-transitory, computer-readable storage medium 75, for example, to operate a computing device 700 such as the printing system. In an example, the non-transitory, computer-readable storage medium 75 can be accessed by the processor 79.

It is to be understood that the flowchart of FIG. 6 illustrates architecture, functionality, and/or operation of examples of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart of FIG. 6 illustrates a specific order of execution, the order of execution may differ from that which is depicted. For example, the order of execution of two or more blocks may be rearranged relative to the order illustrated. Also, two or more blocks illustrated in succession in FIG. 6 may be executed concurrently or with partial concurrence. All such variations are within the scope of the present disclosure.

The present disclosure has been described using non-limiting detailed descriptions of examples thereof that are not intended to limit the scope of the general inventive concept. It should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the general inventive concept and which are described for illustrative purposes. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. An image pipeline execution method, comprising:
    analyzing an attribute of an image, including an image density level of the image;
    determining an image type of the image from a set of predetermined image types based on the image density level of the image;
    dynamically establishing an image pipeline to process the image based on the image type determined based on the image density level of the image; and
    executing the image pipeline to print the image.

2. The image pipeline execution method of claim 1, wherein the analyzing the attribute of an image comprises:
    identifying the image as a plurality of sections;
    determining a section density level for each one of the sections; and
    determining the image density level based on a number of the sections corresponding to respective section density levels.

3. The image pipeline execution method of claim 1, wherein the set of predetermined image types includes at least a color aided design (CAD) type, a black and white CAD type, a black and white graphic image type, and a color graphic image type.

4. The image pipeline execution method of claim 1, wherein the dynamically establishing an image pipeline to process the image based on the image type comprises:
    selecting a plurality of pipeline stages from a set of predetermined pipeline stages to form selected pipeline stages.

5. The image pipeline execution method of claim 4, wherein the predetermined pipeline stages include a line detection and enhancement stage, a color space conversion stage, and a halftoning stage.

6. The image pipeline execution method of claim 4, wherein the dynamically establishing an image pipeline to process the image based on the image type further comprises:
    determining an arranged order of execution of the selected pipeline stages to establish the image pipeline.

7. The image pipeline execution method of claim 6, wherein the executing the image pipeline to print the image comprises:
    processing the image by the selected pipeline stages and in the arranged order thereof; and
    transforming the image to a half-tone image.

8. The image pipeline execution method of claim 7, further comprising:
    printing the half-tone image on a substrate.

9. A printing system, comprising:
    a processor;
    a non-transitory computer-readable data storage medium storing instructions that the processor executes to analyze an attribute of an image, including an image density level of the image, to determine an image type of the image from a set of predetermined image types based on the image density level of the image, to dynamically establish an image pipeline to process the image based on the image type, and to execute the image pipeline; and
    a fluid applicator device to print the image on a substrate based on execution of the image pipeline.

10. The printing system of claim 9, wherein the processor executes the instructions to further:
    identify the image as a plurality of sections, to determine a section density level for each one of the sections, and to determine the image density level based on a number of the sections corresponding to respective section density levels.

11. The printing system of claim 9, wherein the processor executes the instructions to further:
    select a plurality of pipeline stages from a set of predetermined pipeline stages to form selected pipeline stages, and to determine an arranged order of execution of the selected pipeline stages to form the image pipeline.

12. The printing system of claim 11, wherein the processor is to process the image by the selected pipeline stages and in the arranged order thereof, and to transform the image to a half-tone image.

13. The printing system of claim 12, wherein the fluid applicator device is configured to print the half-tone image on a substrate.

14. A non-transitory computer-readable storage medium having computer executable instructions stored thereon to operate a printing system, the instructions are executable by a processor to:
    analyze a density of an image;
    determine an image type of the image from a set of predetermined image types based on the density of the image; and
    dynamically establish an image pipeline to process the image based on the image type by selecting a plurality of pipeline stages from a set of predetermined pipeline stages to form selected pipeline stages; and
    execute the image pipeline to print the image.

* * * * *